(12) United States Patent
Yeh et al.

(10) Patent No.: US 8,284,698 B2
(45) Date of Patent: Oct. 9, 2012

(54) TECHNIQUE FOR SHIFTING NETWORK POINTS OR LINEAR FACILITIES IN A NETWORK PLAN

(75) Inventors: Ching-Yun Yeh, Tampa, FL (US); Robert Funk, Lewisville, TX (US); Kumar Annamraju, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 705 days.

(21) Appl. No.: 12/135,349

(22) Filed: Jun. 9, 2008

(65) Prior Publication Data

US 2009/0303903 A1 Dec. 10, 2009

(51) Int. Cl.
*H04L 12/28* (2006.01)
(52) U.S. Cl. ....................................... 370/254
(58) Field of Classification Search ............... None
See application file for complete search history.

(56) References Cited

U.S. PATENT DOCUMENTS

| 6,748,233 B1* | 6/2004 | Arnold et al. ............... 455/522 |
| 2003/0043821 A1* | 3/2003 | Van Den Bosch et al. ... 370/400 |
| 2006/0240835 A1* | 10/2006 | Jain et al. ..................... 455/446 |

* cited by examiner

*Primary Examiner* — Gregory Sefcheck
*Assistant Examiner* — Amar Persaud (57) ABSTRACT

A computer-implemented method receives a set of data regarding a layout of a network, where the data specifies the interconnection of linear facilities and specifies at least one network point that is disconnected from the network. The computer-implemented method further determines a closest one of the linear facilities to the at least one network point based on the set of data and shifts the at least one network point to connect the at least one network point to the network based on a distance between a vertex associated with the closest one of the linear facilities and the at least one network point. The computer-implemented method also shifts the closest one of the linear facilities to connect the at least one network point in the network based on a distance associated with a linear projection from the at least one network point to the closest one of the linear facilities.

18 Claims, 12 Drawing Sheets

TECHNIQUE FOR SHIFTING NETWORK POINTS OR LINEAR FACILITIES IN A NETWORK PLAN

BACKGROUND

Network planning, such as, for example, planning a geographic layout of an optical fiber network, typically involves analysis of a geographic map by a human planner and the selection and positioning of network nodes and links to enable the desired distribution of network signals. Non-wireless network point facilities (e.g., network hubs) require network connectivity to feed/distribute network signals to their appropriate destinations. Thus, a network plan may include network point facilities, and the linear facilities that interconnect the network point facilities, to establish network connectivity. However, during network planning, errors may cause certain existing network point facilities to become disconnected from the linear facilities. Additionally, during network planning, it may be desirable to relocate or shift existing network facilities (e.g., point or linear facilities). Manual reconnection of disconnected network point facilities or the relocation or shifting of existing network facilities in a network plan, particularly when the network plan may encompass a large region with great numbers of linear and point facilities, may be time consuming and prone to human errors.

BRIEF DESCRIPTION OF THE DRAWINGS

FIG. 1 is a diagram of an overview according to exemplary embodiments described herein;

FIG. 2 is a diagram of a network in which a point/linear facility shifting process according to exemplary embodiments may be implemented;

FIG. 3 is a diagram of a client or server entity of FIG. 2 according to an exemplary implementation;

FIGS. 4A and 4B are flow diagrams that illustrate an exemplary point/linear facility shifting process that may be used to automatically connect/re-connect network points to linear facilities in a network plan;

FIG. 5A depicts an illustrative example of a projection of a network point to linear facilities in a network plan;

FIG. 5B depicts the illustrative example of FIG. 5A where a projection from a network point may be determined to have a shortest projection distance;

FIG. 5C depicts the illustrative example of FIG. 5B where the projection that includes the shortest projection distance may be compared to a loop tolerance value;

FIG. 6 depicts an illustrative example of the insertion of a loop vertex in the linear facility of FIG. 5C;

FIG. 7 depicts an illustrative example of a comparison of a distance between a network point and a linear facility vertex with a tolerance value;

FIG. 8 depicts the network point of FIG. 7 being moved to a linear facility vertex; and FIG. 9 depicts an example of a user interface that displays results of a network point/linear facility shifting process.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein may include a computer-implemented technique that may, in some implementations, be used to automatically connect/reconnect network points to locations in a network. The automated technique described herein may shift network linear facilities to reach the network points, or may shift each network point to a corresponding vertex of the network linear facilities. During automated network planning (e.g., during planning of a fiber optic network), certain network points (or nodes) may become disconnected from the network, or may be added to the network, and may need to be connected into the existing linear facilities of the network. The network points may include, for example, network hubs and the linear facilities may include, for example, fiber optic cables. The automated technique described herein may analyze network layout data and may connect/reconnect network points to a network based on the analysis of the network layout data. The automated technique described herein may serve as a tool to facilitate "spatial conflation" in network planning, where "spatial conflation" involves a process of integrating various geo-spatial data through pruning and reconciliation.

In one implementation, the automated technique described herein may shift linear facilities in close proximity to the network points such that the linear facilities extend to each network point (e.g., via insertion of a loop vertex in a respective linear facility), thus, connecting each network point to the network. In another implementation, the automated technique described herein may shift (e.g., move) the network points to vertexes of linear facilities in close proximity to the network points, thus, connecting the network points into the network at respective vertexes of the linear facilities. The automated technique of exemplary embodiments may permit the connecting/reconnecting of network points to a network layout to be performed in a systematic fashion that is accurate and less prone to error as compared to manual performance of the same tasks by a human.

FIG. 1 is a diagram of an overview according to an exemplary embodiment described herein in which data associated with a network layout, which includes one or more network points that are not connected to the network, is input into an automated process that can connect/reconnect the unconnected network points to the network. As shown in FIG. 1, the data that is input into the automated process may include a list of input points $P_i$, a list of linear facilities $L_j$ and a list of polygon(s) associated with the list of linear facilities. The list of input points $P_i$ may be referenced to a two dimensional coordinate system and may include data that identifies coordinates positions of each of the points $P_i$ in the coordinate system. The list of linear facilities $L_j$ may further be referenced to the two dimensional coordinate system and may include data that identifies coordinates positions of endpoints of each of the linear facilities $L_j$ in the coordinate system. The coordinate position data associated with the input points $P_i$ and the linear facilities $L_j$ may, therefore, indicate the position of respective network nodes (e.g., points) relative to the linear facilities of the network. The two-dimensional coordinate system may include, for example, a Cartesian coordinate system (other coordinate systems, however, may be used).

Each point of the list of input points $P_i$ may include a node associated with the network. For example, each point may include a network hub. Each linear facility of the list of linear facilities may be associated with a link of the network. For example, if at least a portion of the network comprises optical fiber cables, then one or more of the linear facilities may include a span of optic fiber cable. The list of polygons associated with the list of linear facilities may indicate which linear facilities connect together to create a polygon and an identification of each polygon. A "polygon," as referred to herein, may be defined as multiple linear facilities, with each linear facility terminating on a vertex of the polygon, a last linear facility of the polygon connecting to a first linear facility, and no intersection occurring between any two linear facilities of the polygon.

Figure 1:
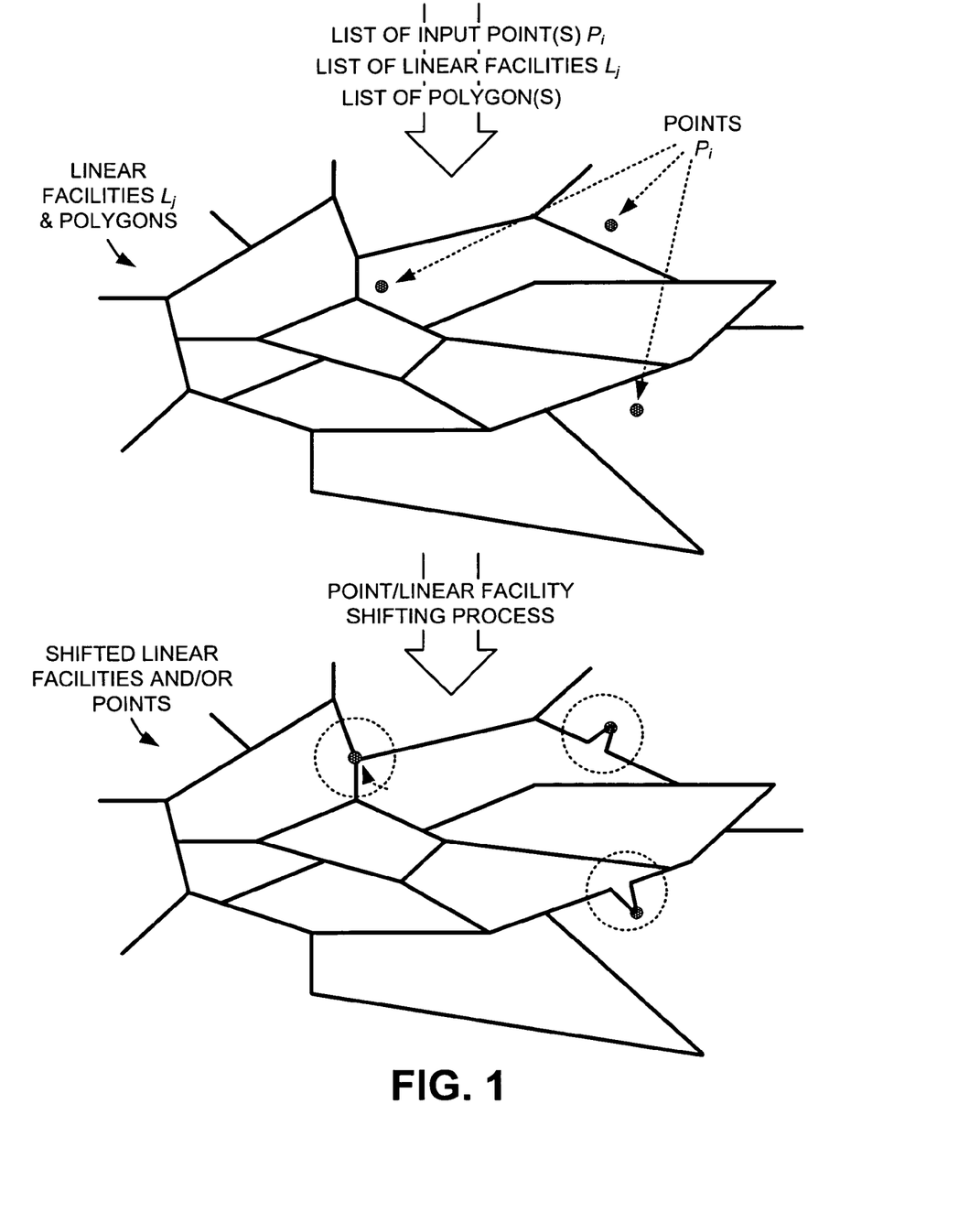

As further shown in FIG. 1, the list of input points $P_i$, list of linear facilities $L_j$ and list of polygons may be input into an automatic point/linear facility shifting process, which may be implemented by a computational device. The automatic point/linear facility shifting process may shift one or more of the input points $P_i$ such that their coordinates coincide with appropriate vertices of the linear facilities, or may shift appropriate linear facilities such that the linear facilities may be extended to reach one or more of the input points $P_i$ at their coordinates. Shifting the one or more input points $P_i$ may include moving each of the one or more points $P_i$ to another coordinate position to coincide with a vertex of the linear facilities. Shifting the one or more input points Pi may be based on a "snap tolerance" that may specify a maximum permissible distance threshold that a respective point may be from a linear facility vertex that the point is being shifted to. Shifting the linear facilities may include inserting a "loop vertex" (e.g., a portion of an additional linear facility that includes a protruding open triangle) into an appropriate linear facility. Shifting the linear facilities may be based on a "loop tolerance" that may specify a maximum permissible distance threshold that a respective point may be from a linear facility into which the "loop vertex" may be inserted to connect to the respective point.

Figure 2:
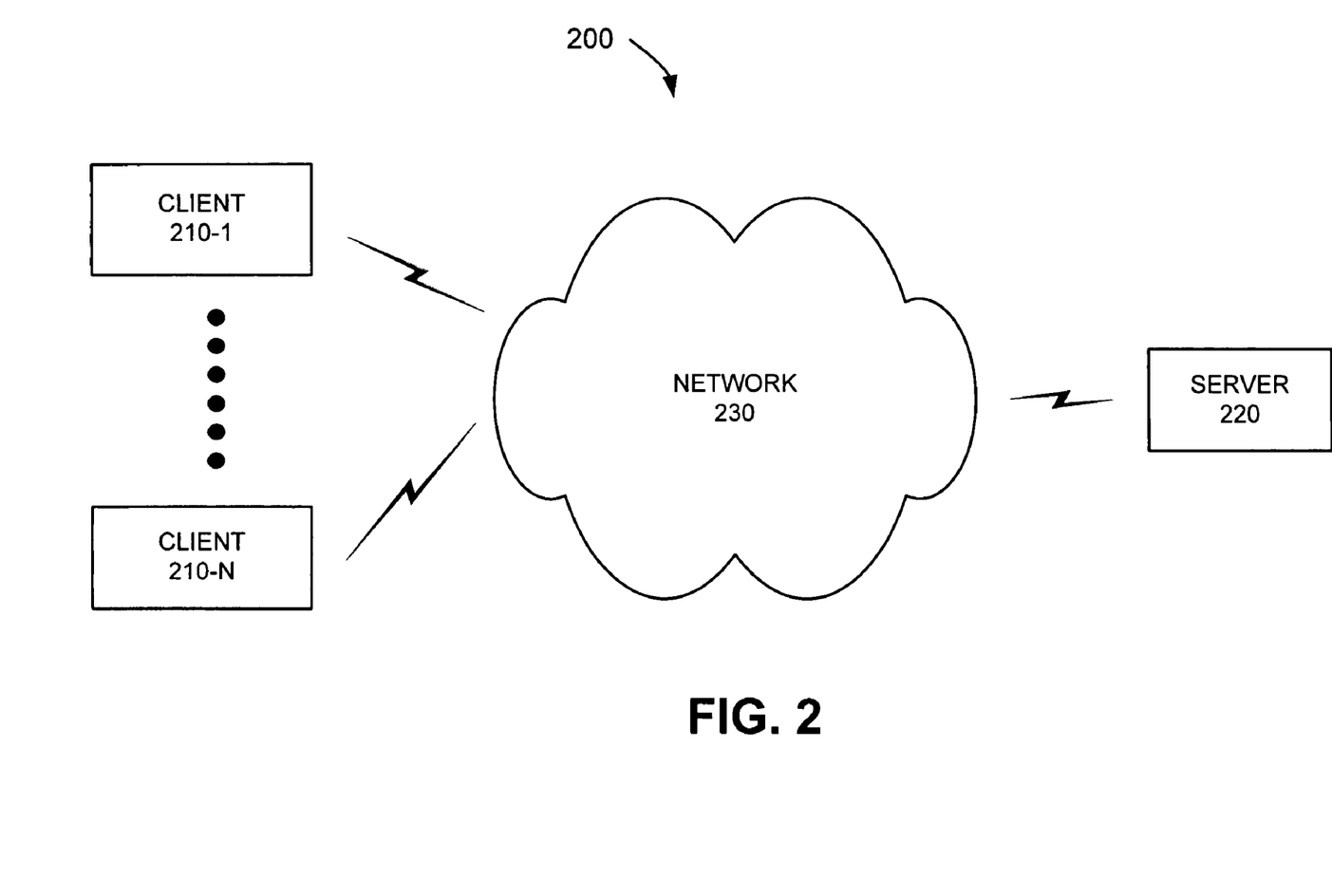

FIG. 2 is a diagram of a network 200 according to an exemplary implementation. Network 200 may include multiple clients 210-1 through 210-N and a server 220 connected to a network 230 via wired or wireless links. Each of clients 210-1 through 210-N may include a device such as a desktop, laptop or palmtop computer, a cellular radiotelephone, a personal digital assistant (PDA), a Personal Communications Systems (PCS) terminal, or any other type of device or appliance that includes computational functionality. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. Each of clients 210-1 through 210-N may implement the exemplary "point/linear facility shifting" process described herein, either alone, in conjunction with one or more other clients, or in conjunction with server 220. Server 220 may include a server entity that may implement the exemplary "point/linear facility shifting" process described herein, either alone or in conjunction with one or more of clients 210-1 through 210-N.

Network(s) 230 may include one or more networks of any type, including a local area network (LAN); a wide area network (WAN); a metropolitan area network (MAN); a telephone network, such as a Public Switched Telephone Network (PSTN) or a Public Land Mobile Network (PLMN); a satellite network; an intranet, the Internet; or a combination of networks. The PLMN(s) may further include a packet-switched network, such as, for example, General Packet Radio Service (GPRS), Cellular Digital Packet Data (CDPD), or Mobile Internet Protocol (IP) network.

Figure 3:
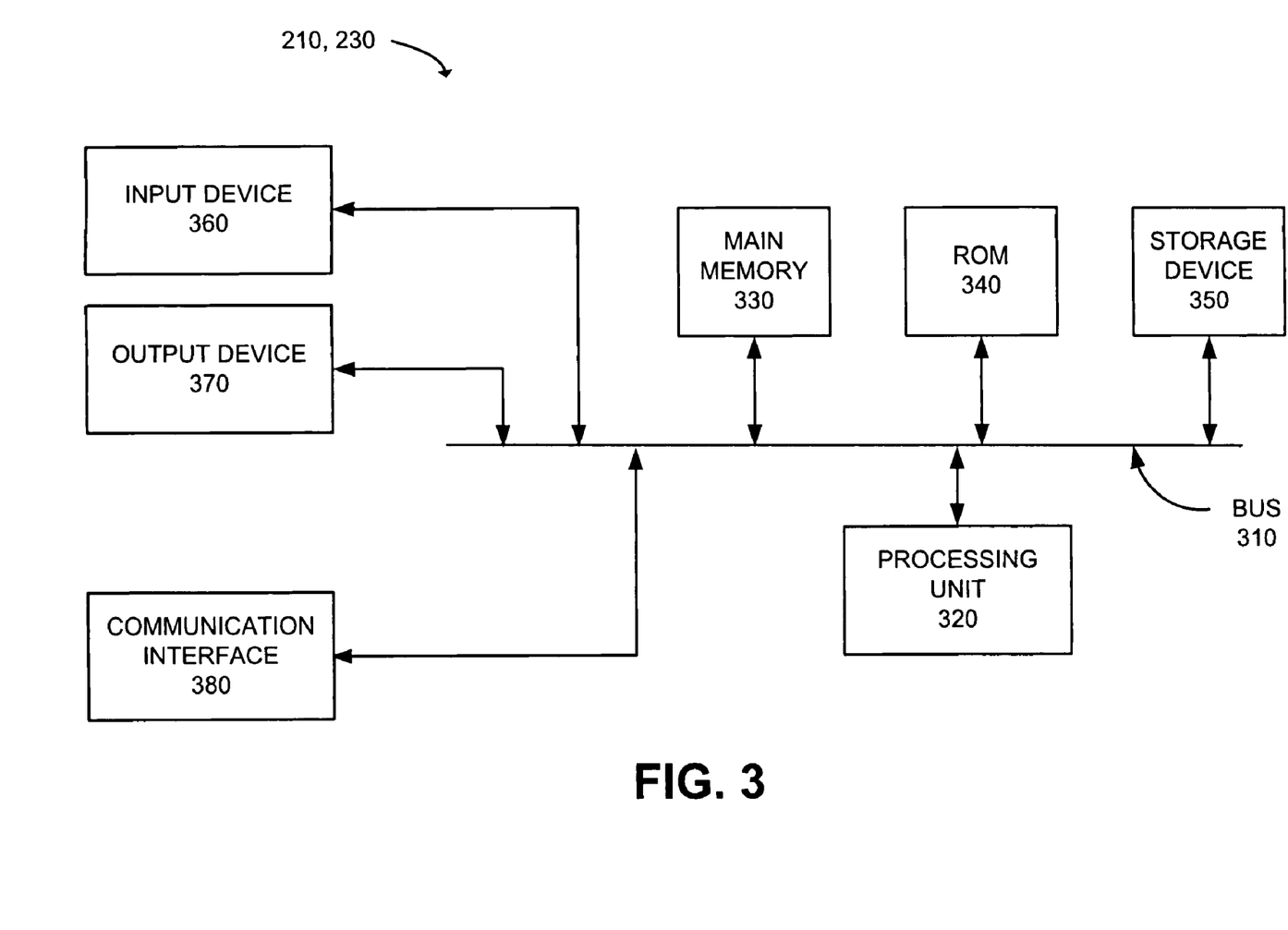

FIG. 3 is an exemplary diagram of a client or server entity (hereinafter called "client/server entity"), which may correspond to one or more of clients 210-1 through 210-N and/or server 220, according to an exemplary implementation. As illustrated, the client/server entity may include a bus 310, a processing unit 320, a main memory 330, a read only memory (ROM) 340, a storage device 350, an input device 360, an output device 370, and a communication interface 380. Bus 310 may include a path that permits communication among the elements of the client/server entity.

Processing unit 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

The client/server entity may perform certain operations or processes described herein. The client/server entity may perform these operations in response to processing unit 320 executing software instructions contained in a computer-readable medium, such as memory 330. A computer-readable medium may be defined as a physical or logical memory device. Each of main memory 330, ROM 340 and storage device 350 may include computer-readable media. The magnetic and/or optical recording media (e.g., readable CDs or DVDs) of storage device 350 may also include computer-readable media.

The software instructions may be read into memory 330 from another computer-readable medium, such as data storage device 350, or from another device via communication interface 380. The software instructions contained in memory 330 may cause processing unit 320 to perform operations or processes described herein. Alternatively, hardwired circuitry may be used in place of or in combination with software instructions to implement processes described herein. Thus, implementations described herein are not limited to any specific combination of hardware circuitry and software.

Figure 4A:
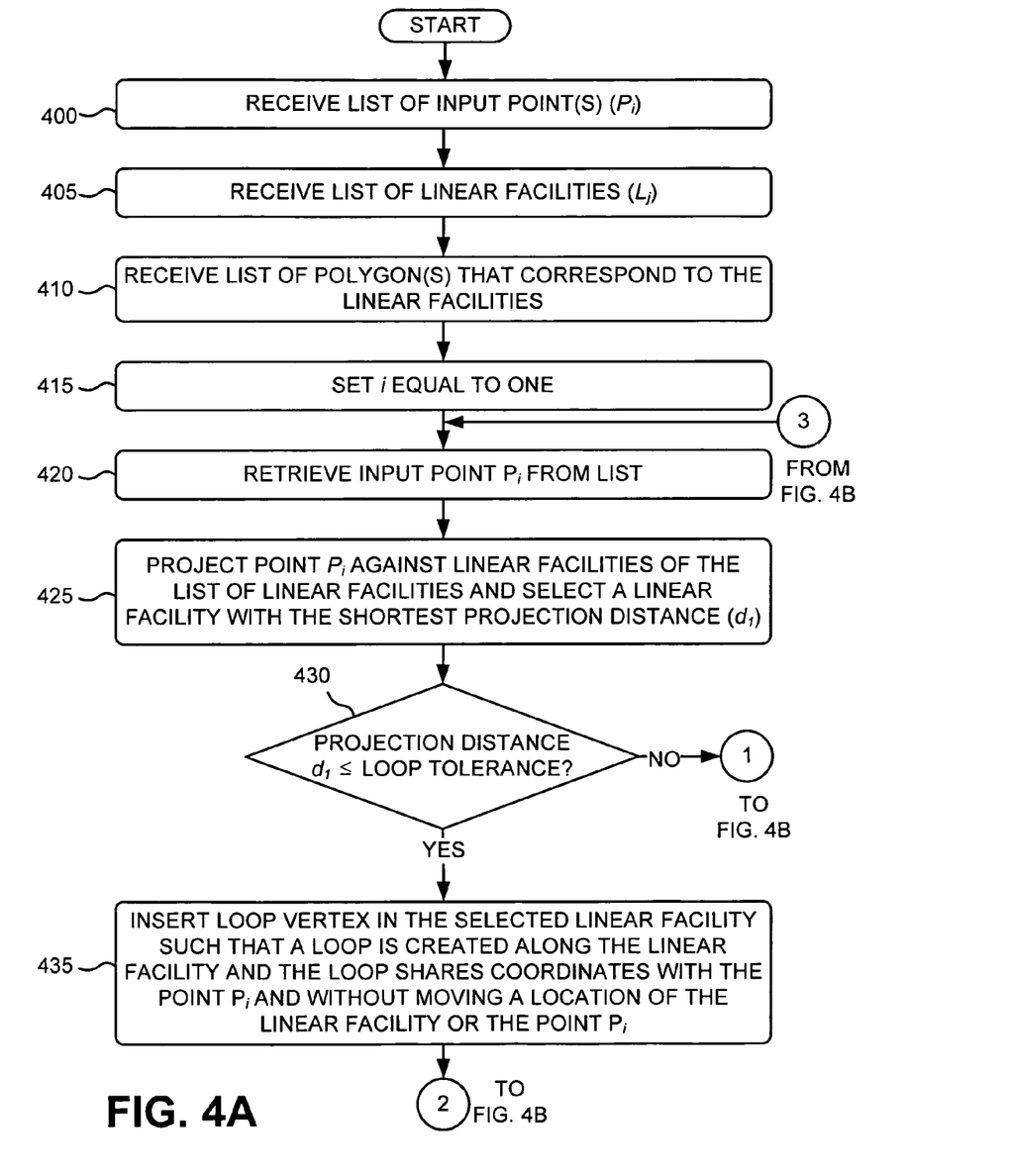
Figure 4B:
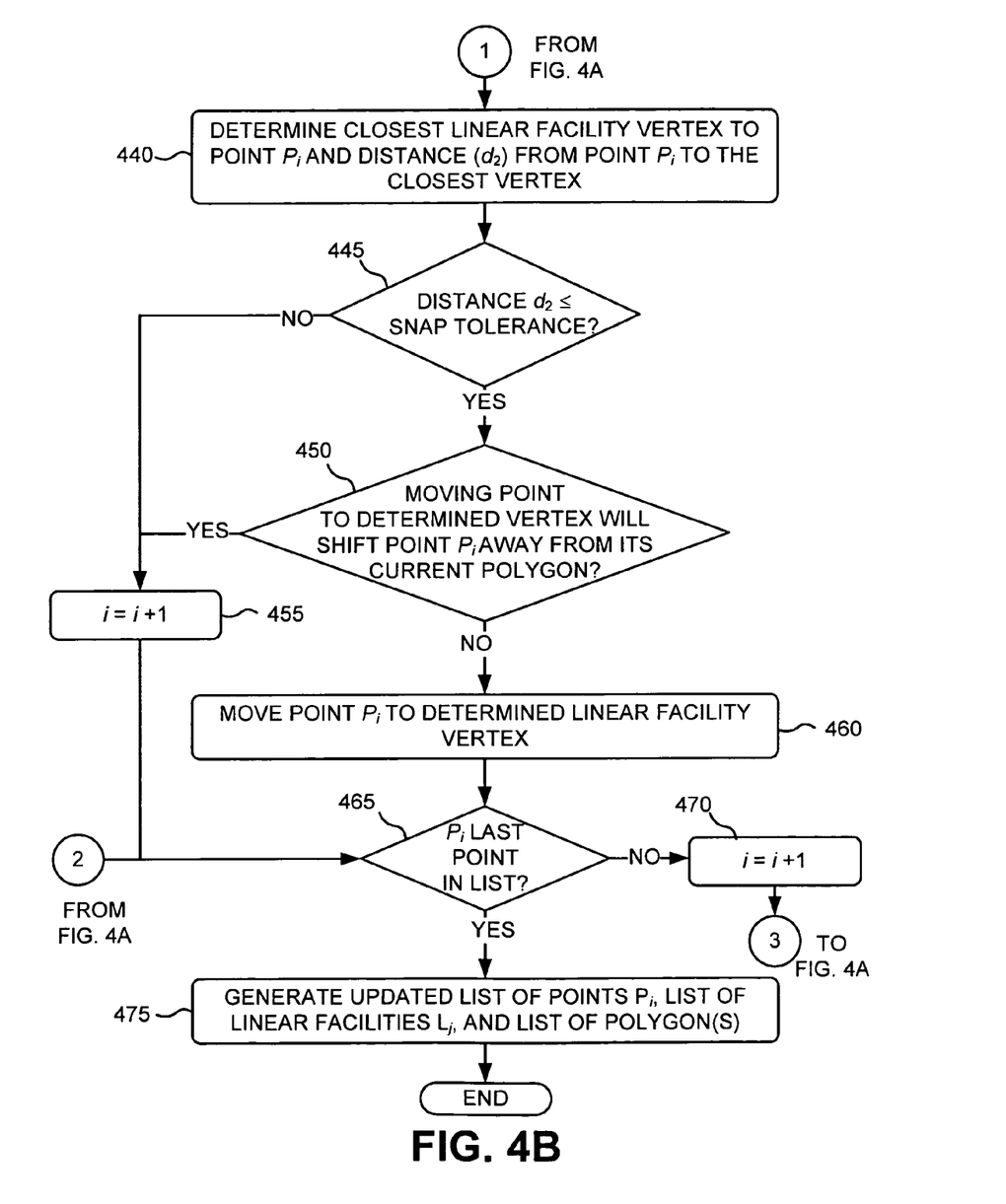

FIGS. 4A and 4B are flow diagrams illustrating an exemplary point/linear facility shifting process that may be used to connect/reconnect network points to the linear facilities of a network. The exemplary process of FIGS. 4A and 4B may be implemented by one of clients 210-1 through 210-N, by server 220, by multiple clients 210-1 through 210-N working in conjunction with one another (e.g., via parallel processing), or by server 220 working in conjunction with one or more of clients 210-1 through 210-N. The point/linear facility shifting process of FIGS. 4A and 4B may, in one implementation, include a sequence of instructions stored in a computer-readable medium (e.g., main memory 330, ROM 340 and/or storage device 350) that may be executed by processing unit 320.

The network point/linear facility process may begin with receipt of a list of input point(s) (Pi) (block 400). The list of input points $P_i$ may be received via communication interface 380, from storage device 350, from main memory 330 or ROM 340, or by manual entry via input device 360. The list of input points $P_i$ may be referenced to a two dimensional coordinate system and may include data that identifies coordinates positions of each of the points $P_i$ in the coordinate system. The coordinate position data associated with the input points $P_i$ may indicate the position of respective network nodes (e.g., points) relative to the linear facilities of the network. The two-dimensional coordinate system may include, for example, a Cartesian coordinate system (other coordinate systems, however, may be used). Each point of the list of input points $P_i$ may include a node, associated with the network, but which is disconnected from the network. For example, each point may include a network hub.

As further shown in FIG. 4A, a list of linear facilities ($L_j$) may further be received (block 405). The list of linear facilities $L_j$ may be received via communication interface 380, from storage device 350, from main memory 330 or ROM 340, or by manual entry via input device 360. The list of linear facilities $L_j$ may be referenced to a same two dimensional coordinate system as the list of input points $P_i$ and may include data that identifies coordinate positions of endpoints of each of the linear facilities $L_j$ in the coordinate system. Each of the linear facilities of the list $L_j$ may correspond to a network link of a network plan. In one exemplary implementation, the linear facilities may include fiber optic cables.

A list of polygon(s) that correspond to the linear facilities may be received (block 410). The list of polygon(s) may be received via communication interface 380, from storage device 350, from main memory 330 or ROM 340, or by manual entry via input device 360. The list of polygons associated with the list of linear facilities may indicate which linear facilities connect together to create a polygon and an identification of each of the created polygons.

A counter value i may be set to one (block 415). The current value of the counter i may indicate the current value of the subscript for points $P_i$. The counter value i, thus, may determine which point $P_i$ of the list of points is to be involved in the point/linear facility shifting process during any portion of the exemplary process of FIGS. 4A and 4B.

An input point $P_i$ may be retrieved from the received list of input points (block 420). The input point $P_i$ may be selected based on the counter value i. Thus, in the first iteration of the point/linear facility shifting process, counter value i may equal one, and point $P_1$ may be retrieved from the list of input points. On the second iteration of the point/linear facility shifting process, counter value i may equal two, and point $P_2$ may be retrieved from the list of input points, etc.

Figure 5A:
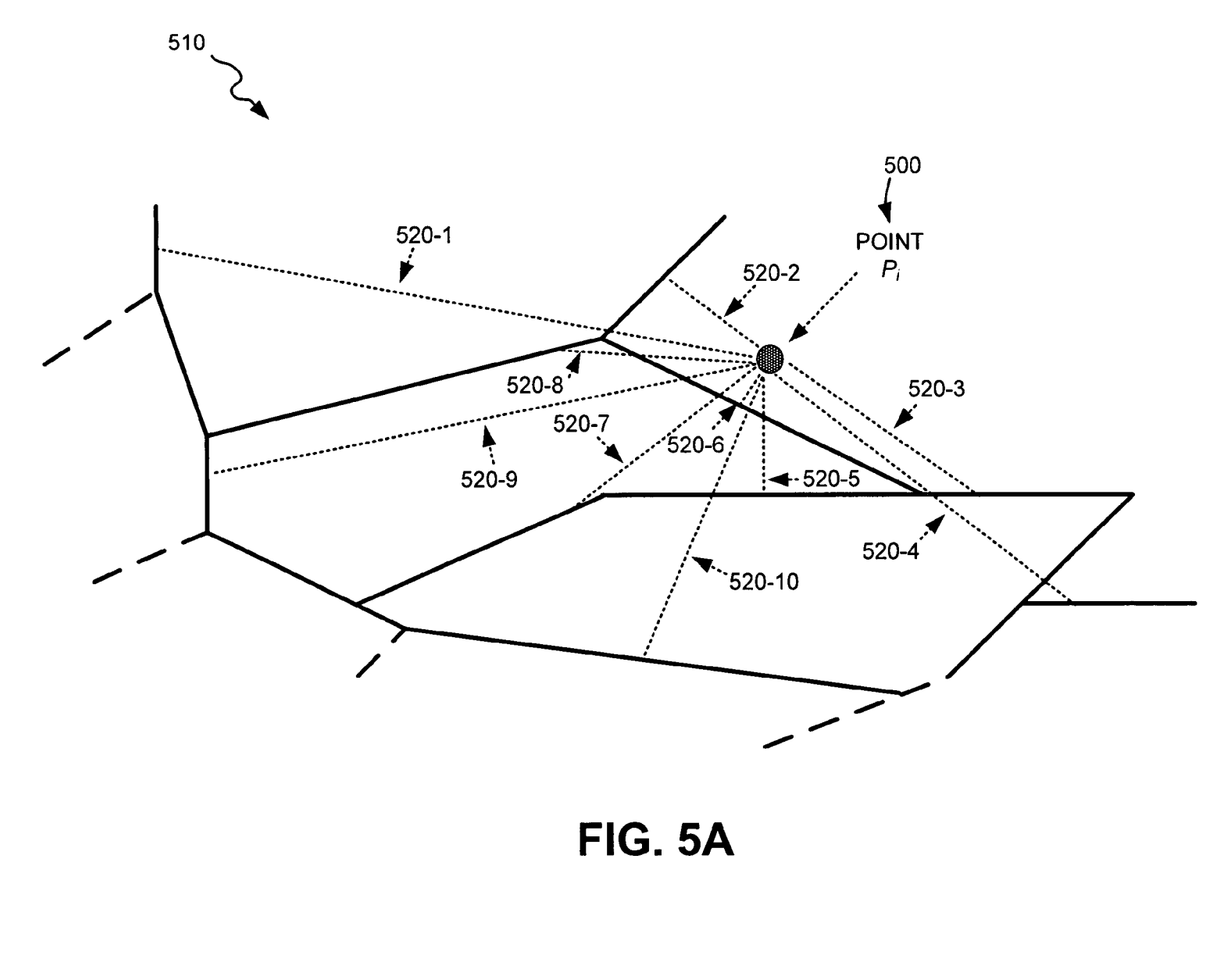
Figure 5B:
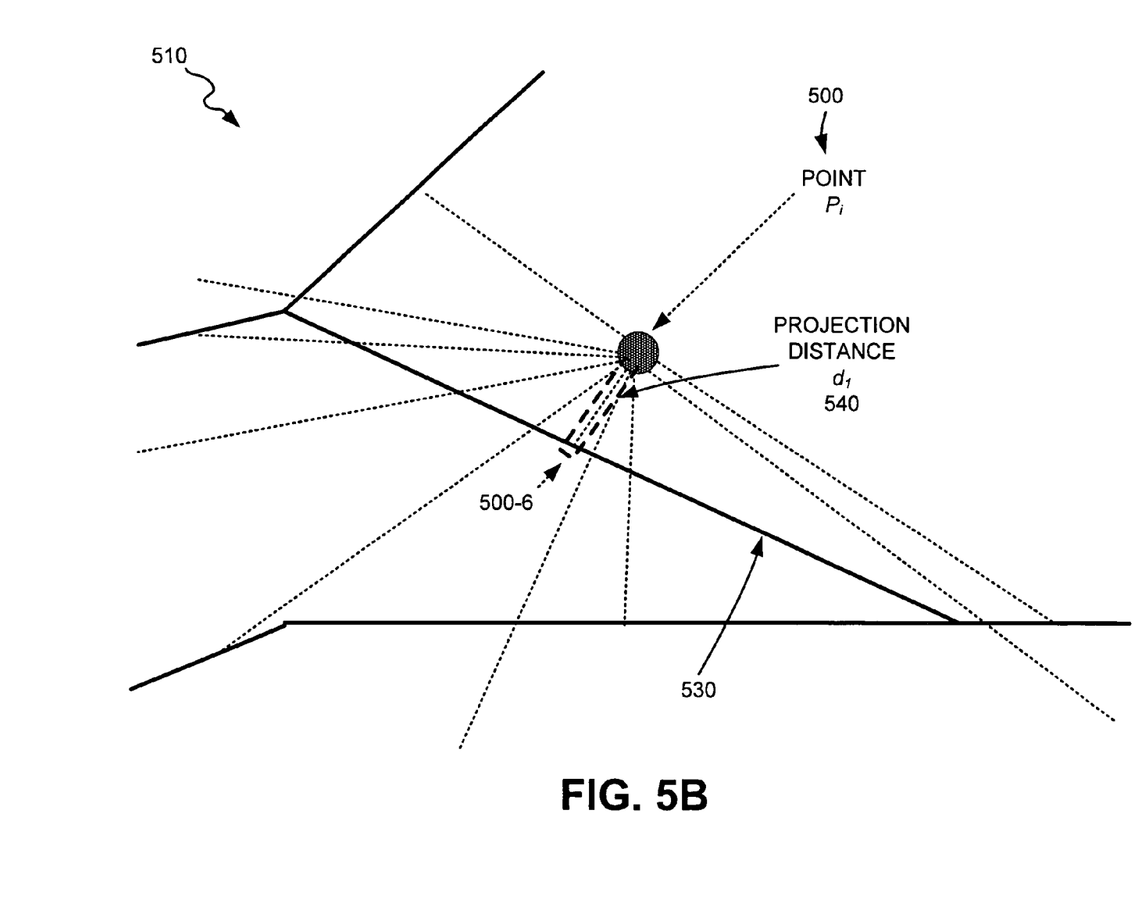

Point $P_i$ may be projected against the linear facilities of the list of linear facilities and a linear facility with the shortest projection distance ($d_1$) may be selected (block 425). Projection of point $P_i$ against the linear facilities of the list of linear facilities may include extending a straight line from point $P_i$ directly to a closest point on each of the linear facilities. FIG. 5A depicts an illustrative example of a point $P_i$ 500 being projected to multiple linear facilities in a facility plan 510. As shown in FIG. 5A, projections 520-1 through 520-9 may be made from point $P_i$ 500 to each linear facility in network facility plan 510. FIG. 5B further depicts a determined linear facility 530 that may include a projection 500-6 with a shortest projection distance ($d_1$) 540 to point $P_i$ 500.

Figure 5C:
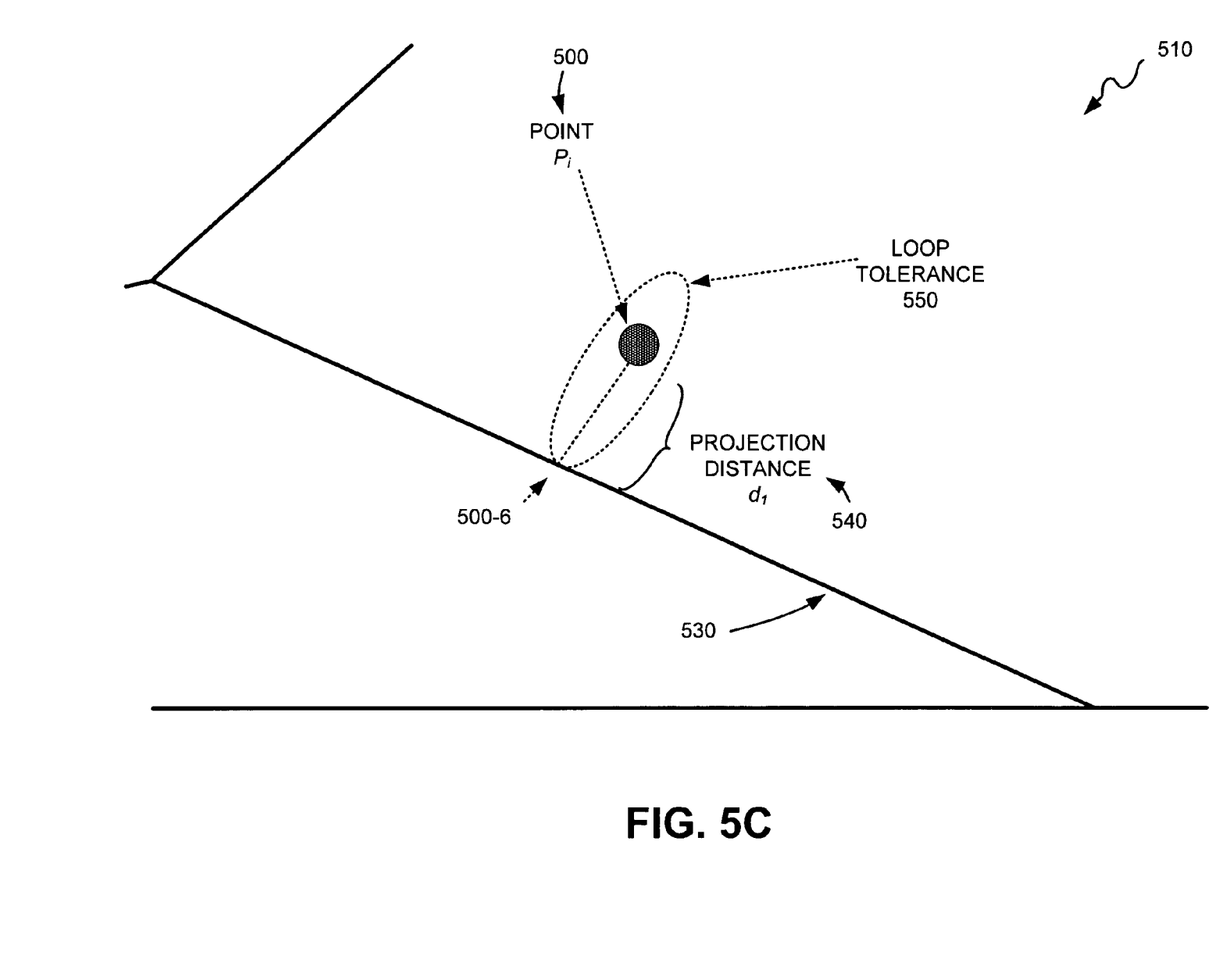

Returning to FIG. 4A, the projection distance $d_1$ may be compared with a "loop tolerance" threshold value to determine whether the projection distance $d_1$ is less than or equal to the "loop tolerance" (block 430). The "loop tolerance" threshold value may include a preset tolerance value that may be related to a length limitation of any "loop vertex" that may be inserted into the linear facility. A "loop vertex" may include a portion of an additional linear facility, which may include a protruding open triangle, and which may be inserted into a given linear facility to extend the linear facility to a network point. The length limitation may be set based on the impact the "loop vertex" may have on the signal strength after the "loop vertex" has been inserted into the linear facility. FIG. 5C depicts the comparison of projection distance $d_1$ 540 of FIG. 5B with a loop tolerance value 550. As can been in FIG. 5C, projection distance $d_1$ 540, in this particular example, may be within (i.e., equal to or less than) the limits of the loop tolerance threshold value 550.

Figure 6:
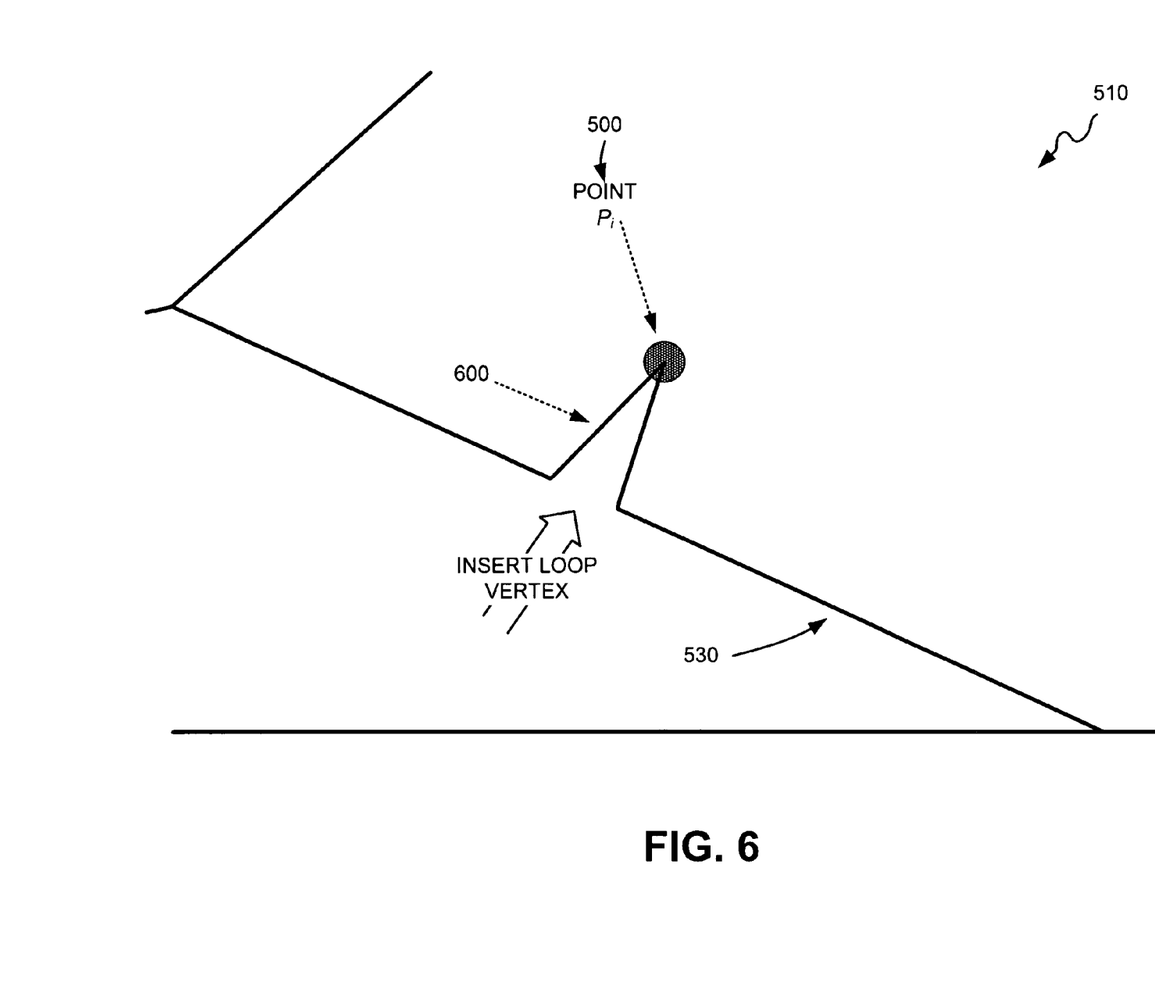

If the projection distance $d_1$ is greater than the "loop tolerance" (block 430—NO), then the exemplary process may continue at block 440 in FIG. 4B. If the projection distance $d_1$ is less than or equal to the "loop tolerance" (block 430—YES), then a "loop vertex" may be inserted in the selected linear facility (selected in block 425 above), such that a loop is created along the linear facility and the loop shares coordinates with the point $P_i$, and without moving a location of the linear facility or the point $P_i$ (block 435). FIG. 6 depicts an example of the insertion of a loop vertex 600 in linear facility 530. As shown in FIG. 5C, projection distance $d_1$ 540 may be less than loop tolerance 550 and, thus, loop vertex 600 may be inserted into linear facility 530 at a point where the projection from point $P_i$ 500 intersects linear facility 530. The exemplary process may then continue at block 465 in FIG. 4B.

Figure 7:
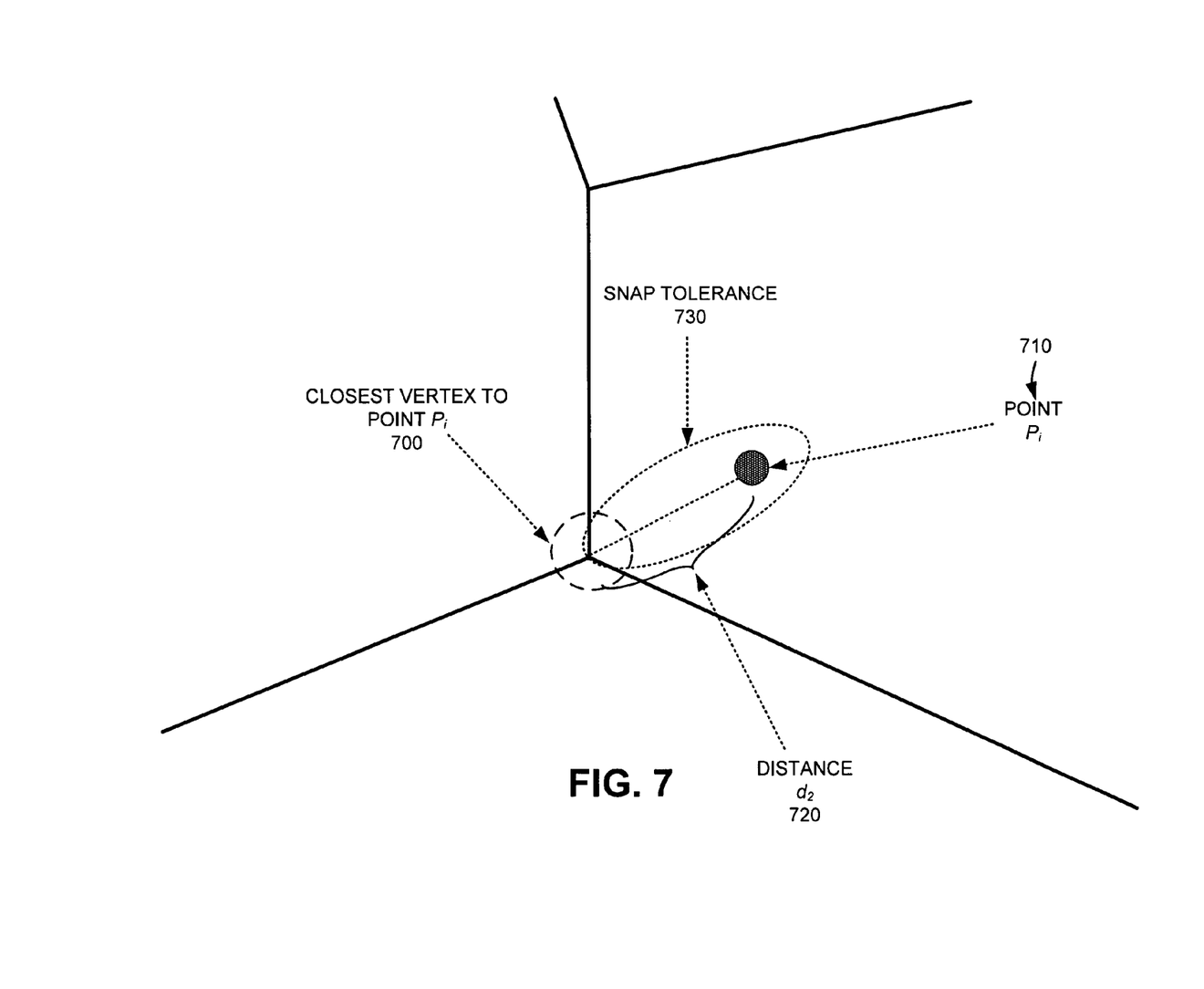

Returning to block 430, if the projection distance $d_1$ is greater than the loop tolerance (block 430—NO), then a closest linear facility vertex to point $P_i$, and a distance ($d_2$) from point $P_i$ to the closest vertex, may be determined (block 440), as shown in FIG. 4B. As depicted in the illustrative example of FIG. 7, a closest vertex 700 to point $P_i$ 710 may be determined and a distance $d_2$ 720 from point $P_i$ 710 to vertex 700 may also be determined.

The determined distance $d_2$ may be compared with a "snap tolerance" threshold value to determine if the distance $d_2$ is less than or equal to the snap tolerance (block 445). The "snap tolerance" value may include a preset value that may be related to a maximum distance that the point $P_i$ should be permitted to be moved. If the distance $d_2$ is greater than the snap tolerance (block 445—NO), then the counter value i may be incremented (i=i+1) (block 455) and the exemplary process may continue at block 465 below. If the distance $d_2$ is less than or equal to the "snap tolerance" (block 445—YES), then a determination may be made whether moving point $P_i$ to the determined vertex will shift point $P_i$ away from its current polygon (block 450). In some specific instances, a closest vertex to point $P_i$ may be a vertex of a different polygon then the current polygon with which point $P_i$ is currently associated.

Figure 8:
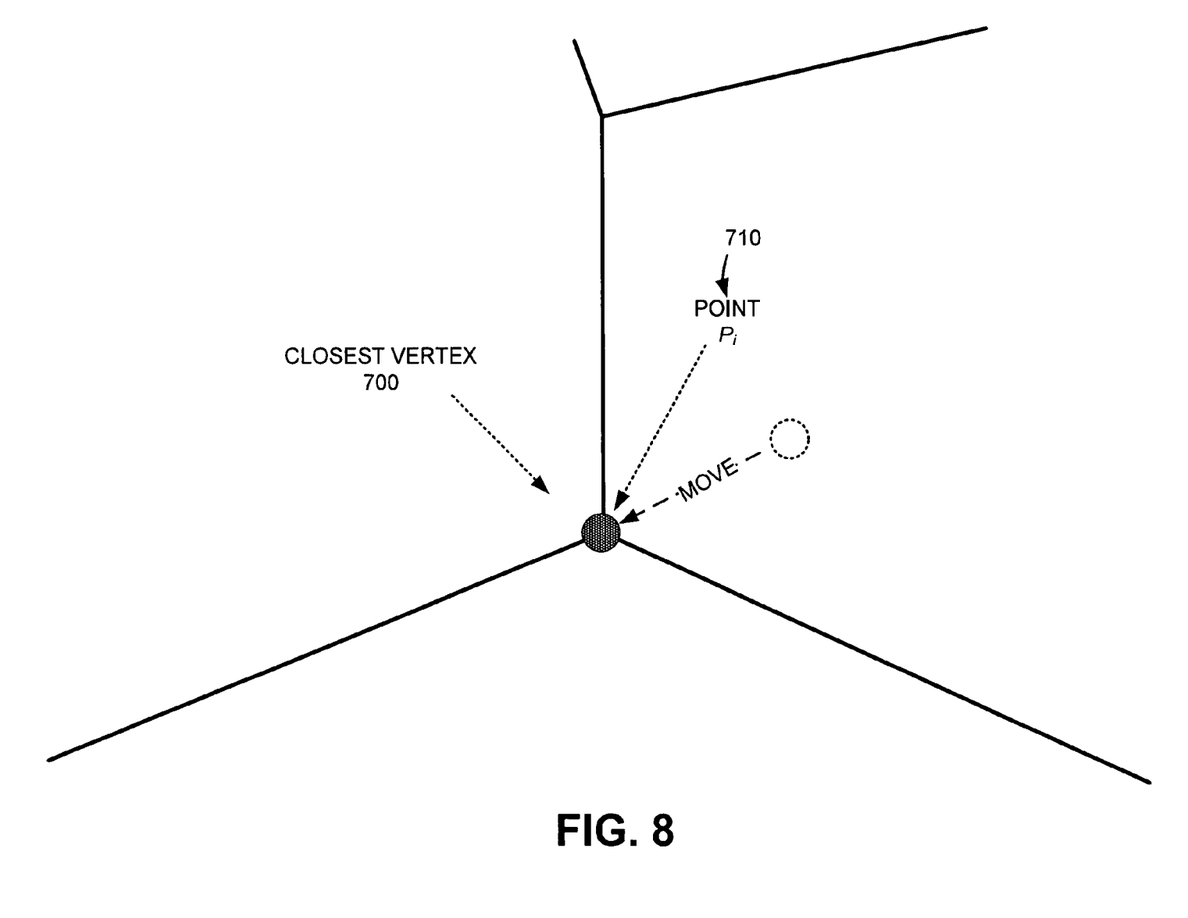

If moving point $P_i$ to the determined vertex will shift point $P_i$ away from its current polygon (block 450—YES), then point $P_i$ may not be shifted to the determined vertex, the counter value i may be incremented (i=i+1) (block 455), and the exemplary process may continue at block 465 below. If moving point $P_i$ to the determined vertex will not shift point $P_i$ away from its current polygon (block 450—NO), then point $P_i$ may be moved to the determined linear facility vertex (block 460). As shown in the illustrative example of FIG. 8, point $P_i$ 710 may be moved to share coordinates with closest vertex 700.

Figure 9:
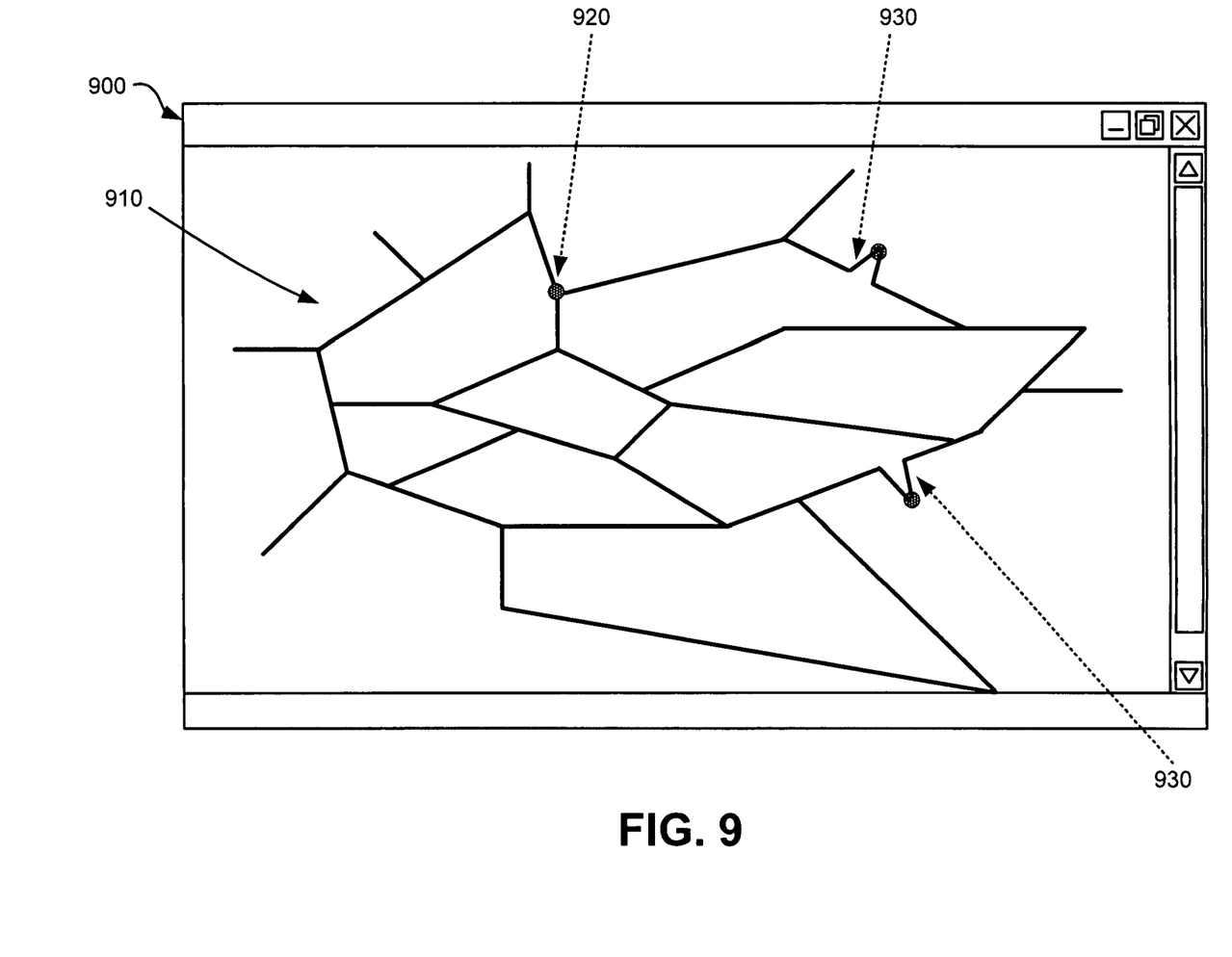

As further shown in FIG. 4B, a determination may be made whether point $P_i$ is a last point in the list of input points (block 465). If not (block 465—NO), then counter value i may be incremented (i=i+1) (block 470) and the exemplary process may return to block 420 of FIG. 4A to process a next network point. If point $P_i$ is a last point in the list of input points (block 465—YES), then an updated list of points $P_i$, list of linear facilities $L_j$, and list of polygons may be generated (block 475). The updated list of points $P_i$ may include an identification of "loop vertices" inserted into linear facilities and locations of any of the points $P_i$ that have been shifted to linear facility vertexes. The updated list of points $P_i$, linear facilities $L_j$ and list of polygons may be presented in a user interface 900, as shown in FIG. 9. User interface 900 may graphically depict a network plan 910 that may include "shifted" points 920 and "shifted" linear facilities 930 that have had "loop vertices" inserted within them.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 4A and 4B, the order of the blocks may be modified in other implementations. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A non-transitory computer-readable medium containing instructions executable by at least one processing device, the non-transitory computer-readable medium comprising:
   one or more instructions for receiving geospatial data related to a point associated with a node to be connected to a network;
   one or more instructions for receiving a network plan that includes the point and a list of linear facilities associated with links of the network, where the point is not connected to the linear facilities;
   one or more instructions for determining, based on the geospatial data, a closest one of the linear facilities to the point;
   one or more instructions for determining, based on the geospatial data, a distance from the point to the closest one of the linear facilities;
   one or more instructions for comparing the distance to a threshold value, where the threshold value is associated with a change in signal strength of the closest one of the linear facilities caused by extending a loop vertex from the closest one of the linear facilities to the point; and
   one or more instructions for modifying the network plan to connect the node to the network, where the one or more instructions for modifying the network plan include:
   one or more instructions for extending the loop vertex from the closest one of the linear facilities to the point based on the comparison, where the loop vertex comprises an additional portion of linear facility that connects a first point of the closest one of the linear facilities to the point and the point to a second point of the closest one of the linear facilities to substantially form an open triangle that protrudes from the closest one of the linear facilities.

2. The non-transitory computer-readable medium of claim 1, where the one or more instructions for comparing the distance to the threshold value further comprise:
   one or more instructions for determining whether the distance is less than or equal to the threshold value, and
   where the one or more instructions for extending the loop vertex from the closest one of the linear facilities to the point is further based on whether the distance is less than or equal to the threshold value.

3. The non-transitory computer-readable medium of claim 1, further comprising:
   one or more instructions for determining, based on the geospatial data, a closest vertex associated with the one of the linear facilities;
   one or more instructions for determining, based on the geospatial data, a distance from the point to the determined closest vertex;
   one or more instructions for comparing the distance, from the point to the determined closest vertex, to a different threshold value; and
   where the one or more instructions for modifying the network plan further include:
   one or more instructions for moving the point to the closest vertex based on the comparison of the distance, from the point to the determined closest vertex, to the different threshold value.

4. The non-transitory computer-readable medium of claim 3, where the one or more instructions for comparing the distance, from the point to the determined closest vertex, to the different threshold value further comprise:
   one or more instructions for determining whether the distance, from the point to the determined closest vertex, is less than or equal to the different threshold value, and
   where moving the point to the closest vertex is based on whether the distance, from the point to the determined closest vertex, is less than or equal to the different threshold value.

5. The non-transitory computer-readable medium of claim 3, where interconnection of the linear facilities of the list of linear facilities creates polygons, the method further comprising:
   one or more instructions for determining whether moving the point to the closest vertex will move the point away from a current polygon, where moving the point to the closest vertex is further based on the determination of whether moving the point to the closest vertex will move the point away from the current polygon associated with the point.

6. The non-transitory computer-readable medium of claim 1, where the node associated with the point comprises a hub to be connected to the network.

7. The non-transitory computer-readable medium of claim 1, where the linear facilities comprise optical fibers of the network.

8. The non-transitory computer-readable medium of claim 1, where the one or more instructions for determining the closest one of the linear facilities to the point further comprise:

one or more instructions for extending a projection from the point to each of the linear facilities, of the list of linear facilities; and one or more instructions for identifying the closest one of the linear facilities based on a length of the projection from the point to each of the linear facilities.

9. A computer-implemented method, comprising:

receiving a set of data regarding a layout of a network, where the data specifies an interconnection of linear facilities, and where the data specifies at least one location associated with a network point that is disconnected from the network;

determining a closest one of the linear facilities to the at least one network point based on the set of data;

modifying the layout of the network to connect the at least one network point to the network, where modifying the layout of the network includes:

shifting the at least one network point to connect the at least one network point to the network based on a distance between a vertex associated with the closest one of the linear facilities and the at least one network point and a first threshold value; and shifting the closest one of the linear facilities to connect the at least one network point to the network based on a distance associated with a linear projection from the at least one network point to the closest one of the linear facilities relative to a second threshold value; and providing a visual representation of the modified layout of the network, where the visual representation of the modified layout includes the shifted network point or the shifted one of the linear facilities.

10. The computer-implemented method of claim 9, where determining the closest one of the linear facilities to the at least one network point comprises:

extending a linear projection from the at least one network point to each of the linear facilities; and determining the closest one of the linear facilities based on a length of the linear projection from the at least one network point to each of the linear facilities.

11. The computer-implemented method of claim 9, where shifting the closest one of the linear facilities comprises:

inserting a portion of a linear facility into the closest one of the linear facilities to extend the closest one of the linear facilities to the at least one network point.

12. The computer-implemented method of claim 9, where shifting the at least one network point comprises:

moving the at least one network point to the vertex when the distance between the vertex and the at least one network point is less than or equal to the first threshold value.

13. The computer-implemented method of claim 9, where the data further specifies a location associated with the at least one network point.

14. The computer-implemented method of claim 9, where the network point comprises a hub.

15. The computer-implemented method of claim 9, where the linear facilities include optical fibers.

16. A system comprising:

one or more non-transitory computer-readable media to store instructions and to store a first threshold value and a second threshold value;

a processing unit that executes the stored instructions to:

receive a set of data regarding a layout of a network, where the data specifies an interconnection of linear facilities and a location associated with a network point that is disconnected from the network, determine a closest one of the linear facilities to the network point based on the set of data, modify the layout of the network to determine a modified layout, where, when determining the modified layout, the processing unit is to:

shift the network point to connect the network point to the network based on a comparison between a distance between a vertex associated with the closest one of the linear facilities and the network point and the first threshold value, and shift the one of the linear facilities to connect the network point to the network based on a comparison between a distance associated with a projection from the network point to the closest one of the linear facilities and the second threshold value; and an output device to provide a visual representation of the modified layout of the network, where the visual representation of the modified layout includes the shifted network point or the shifted one of the linear facilities.

17. The system of claim 16, where when shifting the one of the linear facilities, the processing unit is further to:

insert a portion of another linear facility into the one of the linear facilities to extend the one of the linear facilities to the network point.

18. The system of claim 16, where the linear facilities include optical fibers.

* * * * *